H. PLATT.
PLUMB RULE.
APPLICATION FILED SEPT. 14, 1911.
1,060,284.
Patented Apr. 29, 1913.
2 SHEETS—SHEET 1.
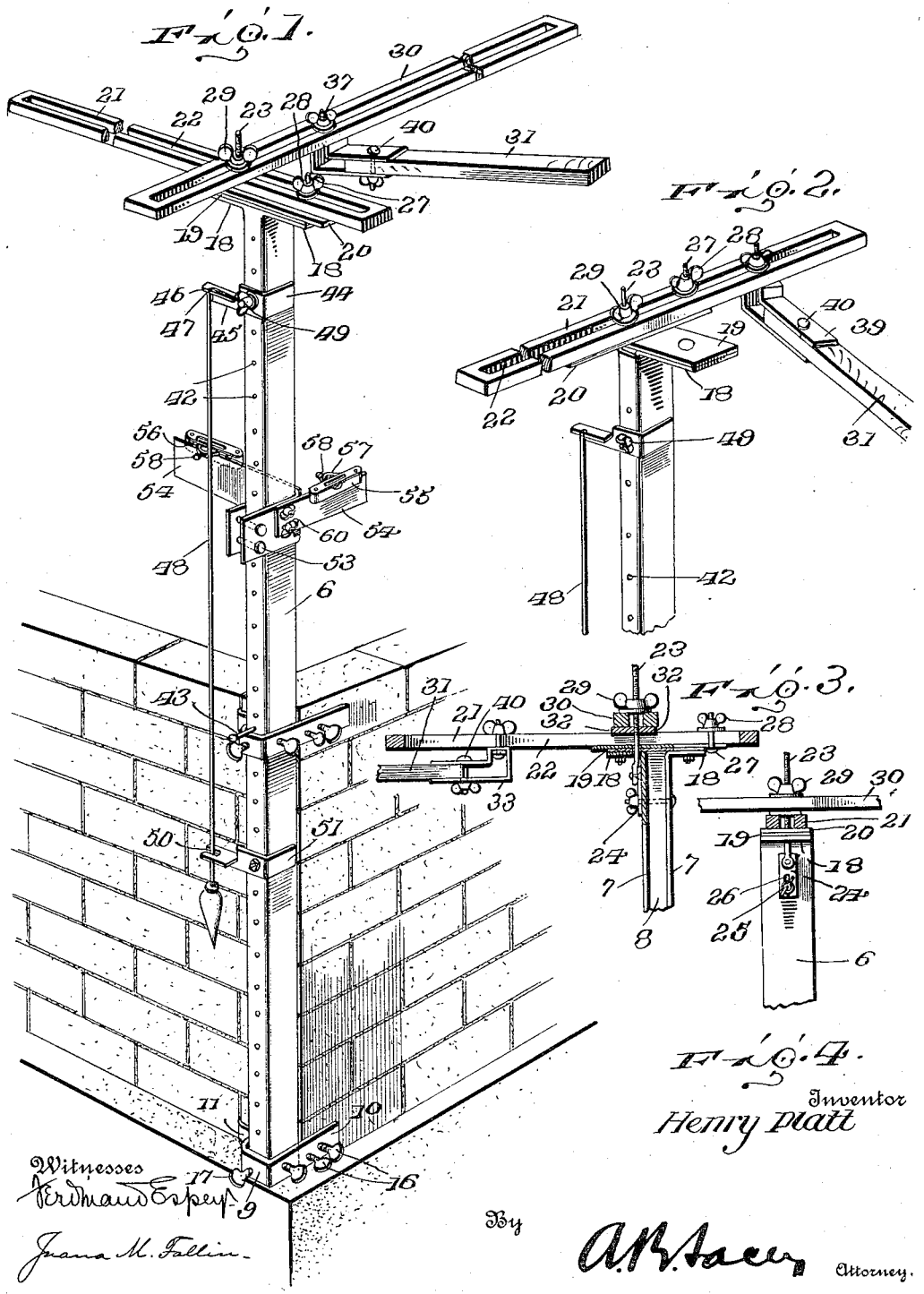
Witnesses
Ferdinand Espey
Joana M. Fallin
Inventor
Henry Platt
By A. R. Stacy, Attorney.

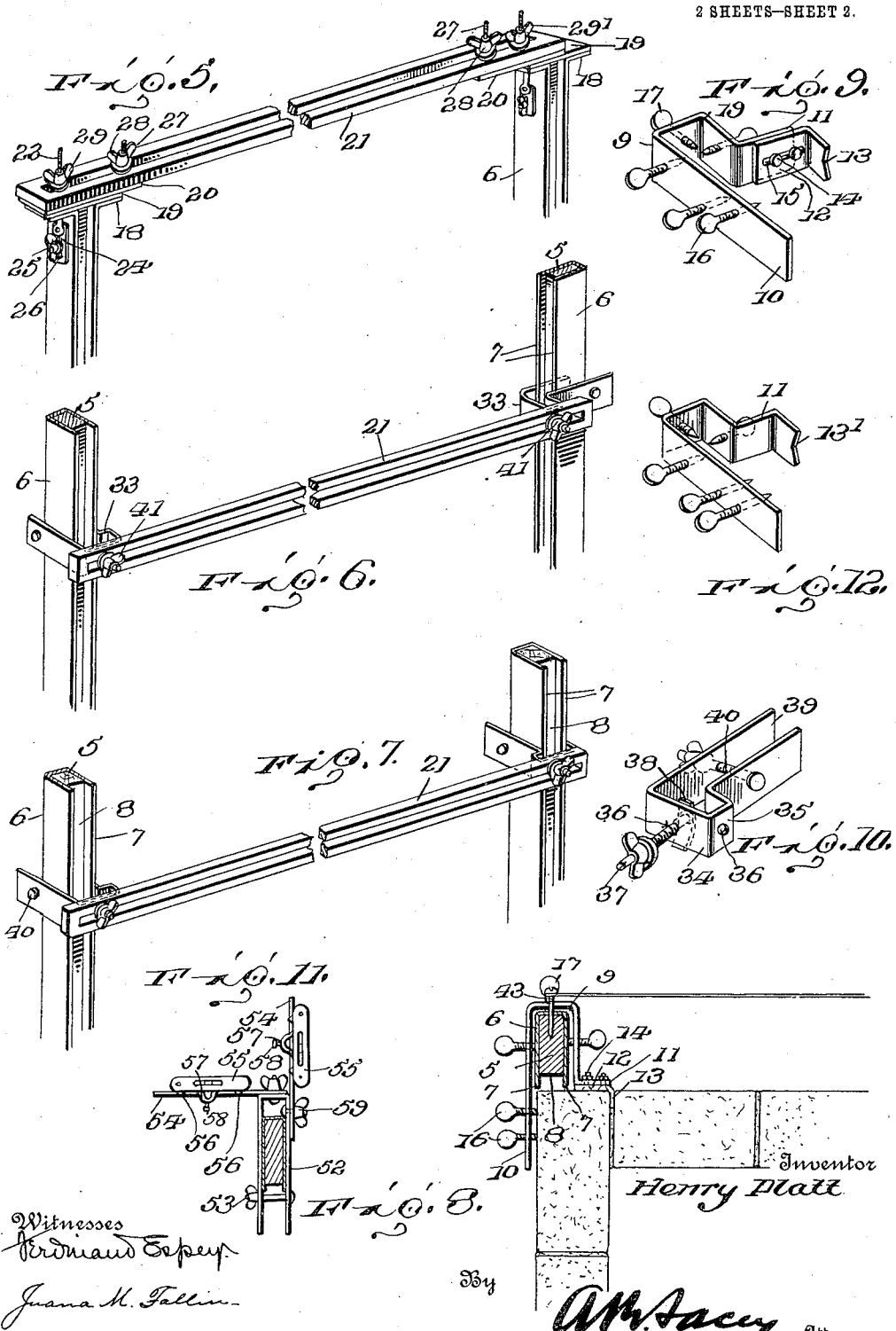

UNITED STATES PATENT OFFICE.

HENRY PLATT, OF SUFFERN, NEW YORK.

PLUMB-RULE.

1,060,284.   Specification of Letters Patent.   Patented Apr. 29, 1913.

Application filed September 14, 1911. Serial No. 649,240.

*To all whom it may concern:*

Be it known that I, HENRY PLATT, citizen of the United States, residing at Suffern, in the county of Rockland and State of New York, have invented certain new and useful Improvements in Plumb-Rules, of which the following is a specification.

This invention relates to bricklayers' tools, and more particularly to a novel form of plumb rule especially designed for use in the erection of right angle work.

The object of the invention is to provide a plumb rule of simple and durable construction capable of being readily attached to or removed from a wall and by means of which the erection of brickwork and other masonry may be materially facilitated, and a better grade or quality of work produced than with the ordinary plumb-bob or rule.

A further object of the invention is to provide a plumb rule having one or more supporting arms pivotally mounted for radial and longitudinal movement on the upper end thereof to permit the attachment of a drop or profile line.

A further object is to provide an auxiliary supporting arm pivotally mounted on and adjustable radially with respect to the main supporting arms for supporting a drop line when erecting or constructing projections, sinkings or batters.

A further object is to provide a plumb rule, the construction of which is such that the main supporting arm or arms may be attached to the longitudinal edge of the rule or connected with a similar rule and used as a spreader when constructing door openings, battery columns, pillars and other parallel plumbings.

A further object is to provide the upper end of the plumb rule with a vertically adjustable bolt which pierces the adjacent line supports and forms the pivotal axes thereof so as to permit one of said supports to be adjusted independently of the other.

A further object is to provide one longitudinal edge of the rule with a plurality of pins, which by engagement with the supporting bracket or brackets serve to hold the rule in different positions of vertical adjustment and also forms a means for permitting the attachment of a temporary line.

A still further object of the invention is generally to improve this class of devices so as to increase their utility, durability, and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and acompanying drawings, in which:

Figure 1 is a perspective view of a corner of a wall, showing a plumb rule embodying the present invention in position thereon; Fig. 2 is a perspective view of the upper end of the rule, showing one of the line supporting arms removed; Fig. 3 is a vertical sectional view, showing the manner of clamping the line supporting arms in adjusted position; Fig. 4 is a side elevation, partly in section, showing the construction of the adjustable pivot pin or bolt; Fig. 5 is a perspective view, showing the manner of using one of the line supporting arms as a spreader when constructing parallel plumbings; Fig. 6 is a similar view, showing the arm or spreader attached to the longitudinal edges of a pair of plumb rules and used for constructing or erecting battery columns; Fig. 7 is a similar view, showing the plumb rules arranged parallel with each other and the spreader attached to the working faces of both rules; Fig. 8 is a transverse sectional view of Fig. 1, showing a temporary line attached to the supporting pin of the plumb rule; Fig. 9 is a perspective view of one of the rule supporting brackets detached; Fig. 10 is a similar view of one of the clamps for holding the spreader in position on the plumb rule; Fig. 11 is a top plan view of the level, the plumb rule being shown in cross section; Fig. 12 is a perspective view, illustrating a modified form of supporting brackets.

Corresponding and like parts are referred to in the following description and indicated in all the views of the drawings by the same reference characters.

The improved plumb rule forming the subject matter of the present invention comprises a longitudinally disposed body portion 5 secured to and housed within a metallic casing 6, the latter being preferably substantially U-shaped in cross-section and having its free edges 7 constituting working faces for contact with a wall and spaced from each other and from the body portion 5 to form a mortar receiving groove 8.

The plumb rule is supported on the exterior face of a wall by one or more reversible brackets, preferably of the construction shown in Fig. 9 of the drawings. Each supporting bracket is preferably formed of a single strip of metal having its intermediate portion bent to produce a substantially rectangular socket 9 adapted to receive the plumb rule, one end of the metal being extended longitudinally in the same plane with the socket to form an arm 10 and the other end of the metal being bent at substantially right angles to said socket to form a short arm 11. Slidably mounted on the short arm 11 of each supporting bracket, is a plate 12 having an angular terminal the free end of which is notched at 13 and adapted to be embedded in the adjacent mortar joint, there being fastening devices 14 passing through a slot 15 in the plate 12 so as to permit said plate to be adjusted laterally to accommodate bricks of different sizes. The bracket is clamped in position on the wall by means of set screws 16, two of which are preferably provided for each arm 10, the inner ends of said screws being pointed so that when the heads thereof are rotated, the points will bite into the adjacent brick and thus prevent accidental displacement of the bracket. It will here be noted that the spurs or teeth formed by the notch 13 enable the bracket to be readily embedded in the mortar, while the clamp screws 16 firmly secure the bracket in position on the adjacent brick. Similar screws 17 also preferably pierce the walls of the socket 9 and bear against the adjacent walls of the plumb rule to hold the latter in position on the wall during the building operation.

The metal forming the casing 6 is extended laterally at the upper end of the plumb rule to form oppositely disposed angle plates 18, to which is bolted or otherwise rigidly secured a top plate 19, the latter coacting with a similar plate 20 to form a bearing. Mounted on the upper plate 20, is a horizontally disposed arm 21 which forms a support for a drop or profile line, said arm being provided with a longitudinal slot 22 which receives a pivot pin or bolt 23 mounted on the plumb rule, as shown. The lower end of the bolt 23 is flattened and secured to a slotted plate 24 mounted for vertical movement on the adjacent face of the plumb rule, there being a bolt or similar fastening device 25 extending through a slot 26 formed in the plate 24 for holding the bolt in different positions of vertical adjustment. One end of the plate 20 is provided with a bolt 27 which extends through the slot 22 for engagement with a wing nut 28 for the purpose of securing the supporting arm 21 in different positions of longitudinal adjustment. Thus it will be seen that by loosening the wing nut 29 on the pivot bolt 23, the arm 21, together with the upper plate 20, may be swung laterally on the fixed plate 19 to different positions of radial adjustment according to where it is desired to suspend the profile line, while by releasing the wing nut 28, the arm 21 may be adjusted longitudinally of the supporting plate 20 so as to extend on either side of the plumb rule and in which position it may be securely clamped by tightening said wing nut.

Arranged above the supporting arm 21, is a second arm 30 similar in construction to the arm 21 and which serves as a means for supporting a relatively short arm 31 from which may be suspended a drop or profile line when performing certain kinds of work. Interposed between the lower and upper arms 21 and 30, is a washer 32 having a threaded bore for engagement with the threads on the bolt 23 so that after the arm 21 has been adjusted to any position, the same may be securely fastened by means of the washer 32 without affecting the upper arm 30. It will here be noted that the bolt 23 forms a pivotal axis for both the arms 21 and 30, the sliding plate 24 permitting the bolt 23 to be adjusted longitudinally of the plumb rule to accommodate either one or two supporting arms, as desired. When but a single arm 21 is used, the plate 24 is lowered and secured in such position by means of the fastening device 25, as best shown in Fig. 2 of the drawings. The short arm 31 is supported on the sliding arm 30 or 21 by means of a clamping member 33 of the construction shown in Fig. 10 of the drawings, said clamping member being provided with an angle head 34 which bears against the lower side of the adjacent arm and is provided with an offset portion 35 having an opening 36 formed therein for the reception of a bolt or similar fastening device 37. A bowed plate or washer 38 is preferably interposed between the head of the bolt and the adjacent portion of the clamping member so as to assist in preventing rotation of the bolt after the clamping nut thereon has been adjusted. The member 33 is provided with spaced clamping arms 39 between which is pivotally mounted on a bolt 40 the adjacent end of the short line supporting arm 31. By such a construction the arm 31 may be adjusted longitudinally of the arm 30 or swung laterally on the pivot pin 40, while the arms 21 and 30 may be adjusted both longitudinally and radially of the plumb rule independently of the short arm 31, thus permitting a wide range of adjustment of the parts. When the rule is used in the erection of parallel plumbings, the upper arm 30 is detached and the outer end of the lower arm 21 connected with the upper bolt of a similar plumb rule and clamped in position thereon by means of a thumb nut 29', as best shown in Fig. 5 of the drawings, and in which position the plumb rules will be rigidly supported in the proper parallel relation throughout their entire lengths. When the device is used in this manner, the arm 21 forms in effect a spreader, as will be readily understood.

If desired, the arm 21 may be entirely detached from the upper end of the plumb rule and used as a spreader in the construction of pillars, battery columns and the like, in which event, the clamping members 33 will be secured to the adjacent edges of a pair of plumb rules and the bar or spreader 21 secured to said clamping members by wing nuts 41. If desired, the working face of one plumb rule, instead of being arranged at right angles to the working face of the mating rule, may be arranged in the same plane therewith, as best shown in Fig. 7 of the drawings, such an arrangement being effected by merely reversing the position of one of the clamping members, there being two openings or perforations 36 formed in the head of each clamping member to permit the passage of the bolts 37 regardless of the position of said clamping members.

The rear or closed end of the casing 6 is formed with a series of vertically disposed spaced recesses or perforations 42 adapted to receive a pin 43, the latter, by contact with the adjacent supporting bracket, serving to temporarily hold the plumb rule in different positions of vertical adjustment, preparatory to permanently clamping the rule on the brackets by the set screws 17. The pin or pins 43 not only serve to temporarily support the plumb rule in adjusted position, but also form means for supporting a temporary line, as best illustrated in Fig. 8 of the drawings.

Secured to the plumb rule near the upper end thereof, is a plate 44 having a laterally extending arm 45, the upper edge of which is provided with an overhanging lip 46 having a slot 47 formed therein to receive the adjacent portion of a plumb line 48. The upper end of the plumb line 48 is wrapped around a bolt 49 piercing the plate 44, while the lower end thereof extends through a slotted lip 50 formed on a similar plate 51 secured to the plumb rule near the lower end thereof, as shown. By such a construction, the line is always supported in a perpendicular position and clear of the face of the wall.

In windy weather, the oscillation or movement of the plumb bob renders it difficult to obtain correct plumbings, and in order to facilitate the erection of walls under such conditions, there is provided a novel form of level of the construction shown in Figs. 1 and 11 of the drawings. The level comprises a substantially U-shaped clamping member or clip 52 adapted to embrace either the front or rear longitudinal edge of the plumb rule and to which it is secured by bolts or similar fastening devices 53 extending through the legs of the clip, as shown. Mounted on the clip or clamping member 52, are supporting plates 54, preferably arranged at right angles to each other, and to each of which is detachably secured a spirit tube or level 55. The casing of each spirit tube is provided with spaced lugs 56 adapted to rest on the upper edge of the adjacent plate 54 and a depending arm 57 having an aperture therein for the reception of a clamping screw 58, which latter bears against the plate and serves to retain the spirit tube in position thereon. The plates 54 are secured to the clip 52 by spaced bolts 59, there being slots 60 formed in the plates at the lower bolts so that by loosening said lower bolts, the plates may be tilted vertically with the upper bolts as pivots when adjusting the levels for the erection of batters and the like, or for obtaining other nice adjustments of said levels. It will of course be understood that after the plumb rule has been properly set by means of the plumb bob, and the level placed in position on said rule, the bob may be removed, as the level is designed to take the place of the plumb bob. It will be noted that the level is adjustable vertically of the plumb rule so as always to be in sight of the bricklayer or other workman when engaged in erecting a wall.

In operation, the lower supporting bracket is clamped in position on the adjacent brick and the plumbing started. As the wall increases in height, the pin 43 is removed and the plumb rule adjusted vertically of the wall and supported in adjusted position by first inserting the pin 43 in the adjacent perforations in the plumb rule and subsequently rotating the set screw 17 in the manner before stated. By loosening the clamping nuts 28, 29 and 37, and moving the several line supporting arms to different positions of radial adjustment with respect to the plumb rule, the profile line may be supported, where desired.

In Fig. 12 of the drawings, there is illustrated a modified form of bracket, in which the adjustable plate 12 is dispensed with and the spurs 13' formed directly on an extension of the arm 11'.

It will of course be understood that the plumb rules and supporting arms may be made in different lengths, and that any desired number of supporting arms may be used in connection with the rule without departing from the spirit of the invention.

Having thus described the invention, what is claimed as new is:

1. A plumb rule including a body portion, a line supporting arm pivotally mounted on the upper end of the body portion to swing laterally about the same and adjustable along the radius of such movement, and an auxiliary line supporting arm pivotally connected with the first mentioned arm.

2. A plumb rule including a body portion, a line supporting arm pivotally mounted on the upper end of the body portion and having a longitudinal slot, and a vertically adjustable pin on the body portion extending through the longitudinal slot of said arm and forming the pivotal axis therefor.

3. A plumb rule including a body portion, a line supporting arm pivotally mounted on the upper end of the body portion to swing laterally about the same and having a longitudinal slot, a pivot pin extending through the slot in the arm, and a carrier for said pin movable vertically on the body portion.

4. A plumb rule having a plate secured rigidly across the upper end thereof, a second plate pivotally mounted on the first mentioned plate, and a line supporting arm carried by the last mentioned plate and adjustable longitudinally of the latter.

5. A plumb rule having a plate secured rigidly across the upper end thereof, a pin secured to the plumb rule below and extending through said plate, a second plate resting on the first mentioned plate and pivotally engaging the pin, and a line supporting arm carried by the last mentioned plate.

6. A plumb rule including a body portion, relatively stationary and movable plates mounted on top of the body portion, a line supporting arm carried by the movable plate, and a vertically adjustable pin mounted on the body portion and extending through both plates and forming the pivotal axis of the movable plate and the arm.

7. A plumb rule including a body portion, a stationary plate secured to the upper end of the body portion, a movable plate co-acting with the stationary plate, a line supporting arm pivotally mounted for lateral and longitudinal movement on the movable plate, and a vertically adjustable pin extending through both plates and piercing the arm to form the pivotal axis of the latter.

8. A plumb rule including a body portion, relatively stationary and movable plates mounted on the upper end of the body portion, a slotted plate slidably mounted on said body portion, a bolt secured to the slotted plate and extending through the stationary and movable plates, a line supporting arm mounted on the movable plate and having a slot formed therein to receive the bolt, means for clamping the slotted plate in adjusted position, and a clamping nut engaging the threaded end of the bolt for securing the line supporting arm in adjusted position.

9. A plumb rule including a body portion, oppositely disposed angle plates secured to the upper end of the body portion, a stationary plate secured to the angle plates, a movable plate mounted on the stationary plate, a pivot pin extending through one of the angle plates and the adjacent stationary and movable plates, a line supporting arm pivotally mounted for longitudinal and lateral movement on the upper end of the bolt, and means engaging the bolt and bearing against the arm for securing said arm in different positions of adjustment.

10. A plumb rule including a body portion, superposed line supporting arms pivotally mounted for longitudinal and lateral movement about the upper end of the body portion, and a pivot pin secured to the side of the body portion and extending upward through both arms and forming the pivotal axes of the latter.

11. A plumb rule including a body portion, superposed line supporting arms pivotally mounted on the body portion for independent lateral and longitudinal movement about the upper end thereof, a vertically adjustable pin secured to the body portion and extending through and forming the pivot for both arms, and means for securing either arm in its adjusted position.

12. A plumb rule including a body portion, a stationary plate secured to the upper end of the body portion, a movable plate co-acting with the stationary plate, a slotted arm mounted on the movable plate, a second slotted arm, a vertically adjustable bolt mounted on the body portion and extending through the plates and slots in both arms, a threaded washer interposed between said arms and engaging the threads on the bolt, and a clamping nut carried by the bolt and engaging the upper arm.

13. A plumb rule including a body portion, a line supporting arm pivotally mounted for lateral and longitudinal adjustment about the upper end of the body portion, and an auxiliary line supporting arm carried by the main supporting arm and adjustable laterally independently of the same.

14. A plumb rule including a body portion, a line supporting arm mounted for longitudinal and lateral movement about the upper end of the body portion, a clamping member mounted on the line supporting member, and an auxiliary line supporting member carried by said clamping member.

15. A plumb rule including a body portion, a slotted line supporting arm mounted for lateral and longitudinal movement on the upper end of the body portion, means for clamping the line supporting member in adjusted position, a clamping member carried by the line supporting member, an auxiliary line supporting member pivotally mounted on the clamping member, and a fastening device extending through the slot in the main line supporting member and engaging said clamping member for securing the auxiliary line supporting member in different positions of adjustment.

In testimony whereof I affix my signature in presence of two witnesses.

HENRY PLATT. [L. S.]

Witnesses:
ALFRED B. RONK,
EVELYN E. HALDEMAN.

Copies of this patent may be obtained for five cents each, by addressing the "Commissioner of Patents, Washington, D. C."